United States Patent [19]

Rossio et al.

[11] Patent Number: 5,073,280

[45] Date of Patent: * Dec. 17, 1991

[54] COMPOSITION FOR INHIBITING STRESS CRACKS IN PLASTIC ARTICLES AND METHODS OF USE THEREFOR

[75] Inventors: Charles E. Rossio, Carleton; Theodore E. Anderson, Grosse Ile, both of Mich.

[73] Assignee: Diversey Corporation, Mississauga, Canada

[*] Notice: The portion of the term of this patent subsequent to May 29, 2007 has been disclaimed.

[21] Appl. No.: 535,473

[22] Filed: Jun. 8, 1990

Related U.S. Application Data

[63] Continuation-in-part of Ser. No. 398,542, Aug. 25, 1989, Pat. No. 5,009,801, which is a continuation-in-part of Ser. No. 218,893, Jul. 14, 1988, Pat. No. 4,929,375.

[51] Int. Cl.$^5$ .............................................. C10M 173/02
[52] U.S. Cl. ................................ 252/49.3; 252/48.2; 252/50; 252/51.5 R; 252/52 R; 252/34
[58] Field of Search ................................. 252/49.3, 50

[56] References Cited

U.S. PATENT DOCUMENTS

| | | | |
|---|---|---|---|
| 3,186,946 | 6/1965 | Sluhan | 252/49.3 |
| 3,583,914 | 6/1971 | Garvin et al. | 252/49.3 |
| 3,860,521 | 1/1975 | Aepli et al. | 252/49.3 |
| 4,486,324 | 12/1984 | Korosec | 252/49.3 |
| 4,539,125 | 9/1985 | Sato | 252/49.3 |
| 4,604,220 | 8/1986 | Stanton | 252/49.3 |
| 4,769,162 | 9/1988 | Remus | 252/49.3 |
| 4,839,067 | 6/1989 | Jansen | 252/49.3 |
| 4,929,375 | 5/1990 | Rossio et al. | 252/49.3 |

FOREIGN PATENT DOCUMENTS

| | | |
|---|---|---|
| 0372628 | 6/1990 | European Pat. Off. . |
| 0384282 | 8/1990 | European Pat. Off. . |

*Primary Examiner*—Prince E. Willis
*Assistant Examiner*—Ellen McAvoy
*Attorney, Agent, or Firm*—Weintraub, DuRoss & Brady

[57] ABSTRACT

Stress cracking in poly(alkylene terephthalate) articles of manufacture is inhibited by applying to the article a stress crack inhibitor which contains an amine having at least 6 carbon atoms. In a preferred embodiment, the stress crack inhibitor is applied to the article in the form of an aqueous fatty acid-based lubricant.

15 Claims, No Drawings

COMPOSITION FOR INHIBITING STRESS CRACKS IN PLASTIC ARTICLES AND METHODS OF USE THEREFOR

CROSS-REFERENCE TO RELATED APPLICATIONS

This application is a continuation-in-part application of copending U.S. patent application Ser. No. 398,542, filed Aug. 25, 1989, now U.S. Pat. No. 5,009,801, for "Composition For Preventing Stress Cracks in Poly(alkylene terephthalate) Articles and Methods of Use Therefor," the disclosure of which is hereby incorporated by reference, and which, in turn, is a continuation-in-part application of copending U.S. patent application Ser. No. 218,893, filed July 14, 1988, now U.S. Pat. No. 4,929,375 for "Conveyor Lubricant Containing Alkyl Amine Coupling Agents", the disclosure of which is hereby incorporated by reference.

BACKGROUND OF THE INVENTION

1. Field of the Invention:

The present invention pertains to compositions for inhibiting stress cracking in plastic articles of manufacture, and methods of using those compositions. More particularly, the present invention concerns aqueous-based fatty acid lubricant compositions containing such stress crack inhibitors and methods of using the same. Even more particularly, the present invention concerns aqueous fatty acid-based lubricant concentrates and use solutions prepared therefrom which contain such stress crack inhibitors, and methods of applying the use solutions to poly(alkylene terphthalate) articles to inhibit stress cracking therein.

2. Prior Art:

As is known to those skilled in the art to which the present invention pertains, there has been an ever increasing usage of synthetic resinous containers for fluids and solids. Likewise, as is known to those skilled in the art, such containers are normally filled or washed by passing them through filling and capping stations or through a washing system along manually, mechanically or electronically-operated conveyor systems.

In order to ensure efficient operation of the filling or washing systems it is essential that the conveyor systems, per se, be continuously lubricated. Otherwise, the containers may stack up along the conveyor system and their movement become impeded.

Thus, the conveyors are, ordinarily, continuously lubricated by applying to the conveyor a lubricant, such as by spraying or the like. Typically, conventional lubricants contain alkaline materials, alcohols and other constituents which have a deleterious effect on the plastic articles disposed along the conveyor system.

Indeed, it has long been known that exposure of such articles to these lubricants leads to a phenomenon which as been identified as "stress cracking" which is especially prevalent in poly(alkylene terephthalate) containers and other such plastic articles of manufacture. This is true with respect to both poly(ethylene terephthalate) and poly(butylene terephthalate) containers.

As noted, conventional prior art aqueous-based lubricants containing alcohols and/or alkaline compounds do not inhibit or prevent stress cracking in such containers, but rather, promote stress cracking.

Heretofore, the only proposed prior art method of inhibiting stress cracking in plastic bottles known to the applicants, has been the incorporation of an alkali metal salt of a hydrophilic substituted aromatic hydrocarbon and other hydrotropes into a liquid bleach, such as disclosed in Colborn, European Patent Application No. EP 302705 A2, filed Feb. 8, 1989. This application discloses the use of the hydrotropes as an internal adjustment to the bleach to inhibit stress cracking in high density polyethylene containers. Yet, the art has not directed itself to lubricants and other media for applying a dilute aqueous solution to the exterior of an article to inhibit stress cracking in polyethylene or polybutylene terephthalate bottles or other plastic articles of manufacture. Moreover, the prior art has not recognized the utility of using amines to inhibit stress cracking in plastic articles.

In the above-identified copending U.S. patent Applications, the disclosures of which are hereby incorporated by reference, there are disclosed fatty acid-based conveyor lubricants containing alkyl amines as coupling or saponifying agents for the fatty acid and an alkyl aryl sulfonate as a solubilizing agent for the fatty acid.

The copending applications further teach that the alkyl aryl sulfonates tend to inhibit stress cracking in poly(alkylene terephthalate) articles, such as beverage containers and the like. Furthermore, the copending applications teach that amines can be used in the formation of conveyor lubricants which are highly dilutable and which inhibit stress cracking.

According to the copending applications, it was necessary, to essentially reformulate prior, well-known conveyor lubricants in order to achieve the desired results. For example, conventional prior art conveyor lubricants, as usually found in bottling operations, typically employ an alkali metal hydroxide, such as potassium hydroxide, and/or a glycol, such as hexylene glycol as a low temperature stabilizer. However, both types of compound, i.e., alkali metal hydroxide and glycols are well known promoters of stress cracking in poly(alkylene terephthalate) beverage containers and similar articles.

Thus, it would be highly desirable if the advantages of compositions of the copending applications could be imbued with the conventional prior art components. It is this need to which the present invention is directed.

SUMMARY OF THE INVENTION

As noted above, the applicant's copending application Ser. No. 398,542 discloses a highly dilutable aqueous lubricant concentrate which appears to inhibit stress cracking by combining an alkyl amine as a saponifying agent and an alkyl aryl sulfonate, as a solubilizing agent for a long chain fatty acid. While the compositions of the copending applications are efficacious for preparing highly dilutable lubricants, it has now been found that the sulfonate, per se, is not always essential to the prevention of stress cracking in plastic articles, and particularly in poly(alkylene terephthalate) articles. Rather, it has now been found that a certain class of amines, with a sufficiently large molecular size, will inhibit stress cracking without the presence of the alkyl aryl sulfonates, when formulated into fatty acid lubricants fromm lubricant concentrates. This finding enables the production of dilutable, cost efficient, fatty acid-based aqueous lubricant compositions which have a tendency to inhibit stress cracking when dilute use solutions thereof are applied to surfaces of poly(alkylene terephthalate) articles. Likewise, this finding enables implementation of other means and methods for inhibiting stress cracking in poly(alkylene terephthalate) articles.

In a first aspect of the present invention, stress cracking in a poly(alkylene terephthalate) article of manufacture is inhibited by applying, to a surface of the article of manufacture, an alkyl amine having at least 6 carbon atoms. The amine used may be primary, secondary, tertiary, quaternary, diamines, or mixtures thereof. Alternatively, the amine may be incorporated into material stored within a plastic container to inhibit stress cracking of the container.

In the practice of a preferred embodiment of the present invention, an aqueous-based fatty acid lubricant composition is prepared from a concentrate comprising:

(a) a long-chain fatty acid or salt thereof;
(b) an alkyl amine having at least 6 carbon atoms as a stress crack inhibitor;
(c) a chelant or sequestrant; and
(d) water.

A saponifying agent may be included to convert the fatty acid to a soap. The saponifying agent may be the amine, although other saponifying agents such as alkali metal hydroxides may be used in addition to the amine. Ordinarily, the amine is present in the concentrate in an amount ranging from about 2 percent to about 16 percent, by weight, based on the total weight of the concentrate.

In use, the concentrate may be diluted with water in concentrations ranging from about 1:100 to about 1:1000, by weight, to form a use solution. The use solution may be applied by manual application, spraying or the like.

In a second aspect of the present invention, it has been discovered that the combination of an aryl sulfonate with a primary, secondary or tertiary alkyl amine or mixture of amines having 2-6 carbons in an alkyl group thereon, will also inhibit stress cracking when applied to the surface of a poly(alkylene terephthalate) article, and the presence of the sulfonate in combination with these smaller amines increases resistance to stress cracking, as compared to the amine without the sulfonate.

Suitable sulfonates, usable in conjunction with the smaller amines in the practice of the present invention, include the sulfonate of an aromatic hydrocarbon and may be selected from the group consisting of sodium xylene sulfonate, sodium decyl diphenyl oxide sulfonate, sodium dimethyl napthalene sulfonate, and mixtures thereof. The combinations of the aryl sulfonate and the smaller amines can also be applied in a dilute use solution which has been prepared from a concentrate.

A straight-chain alkyl sulfonate may also be used as a component of the lubricant concentrate to provide detergency, but the straight chain sulfonate does not inhibit stress cracking.

Alternatively, the stress crack inhibitor may be applied directly to the container as a pretreatment coating or may be incorporated as a rinse aid during a washing cycle for a bottling or dishwashing operation.

For a more complete understanding of the present invention, reference is made to the following detailed description and accompanying examples.

DESCRIPTION OF THE PREFERRED EMBODIMENT

As noted hereinabove, the present invention, in a first aspect hereof provides a method for inhibiting stress cracking in a plastic article such as, e.g., a poly(alkylene terephthalate) article of manufacture, by applying thereto a stress crack inhibitor which comprises an amine having at least 6 carbon atoms. The stress crack inhibitor hereof, preferably, comprises an amine having 10 or more carbon atoms. Stress crack inhibition appears to be more effective with amines of larger size. In one embodiment hereof, the preferred amine may contain between 10 and 40 carbon atoms in the structure thereof. The amine may be alkoxylated to promote water solubility thereof, as is outlined herein.

In products such as cleaning compositions which are stored within plastic containers, and which will not be detrimentally affected by the presence of an amine in the composition, an amine may be incorporated thereinto to impart stress crack resistance to the container.

Alternatively, the stress crack inhibitor may be applied to an exterior surface of the article in an operation such as a rinse cycle in a bottling or machine dishwashing operation, or the amine may be a component of a mold release agent in a blow molding process.

In another embodiment hereof, the amine may be applied to an exterior surface of an article of manufacture by spraying or wiping, or by dipping of the article in a solution which contains the amine. The article is then preferably, either pressurized to approximately 4.5 atm (67 psig) or heated to approximately 65° C. for a period of 2 hours or more to allow the amine to interact with the surface of the article.

In a further aspect hereof, the present invention provides a fatty-acid based aqueous lubricant concentrate, and a use solution prepared therefrom, which incorporates the stress crack inhibitor.

The lubricant concentrate contemplated herein,, generally, comprises:

(a) a fatty acid,
(b) an alkyl amine having at least 6 carbon atoms as a stress crack inhibitor;
(c) a chelant or sequestrant, and
(d) water.

More particularly, the concentrate comprises, by weight:

(a) from about 0.25 to 40 percent, of the fatty acid,
(b) from about 2 to about 16 percent of the amine,
(c) from about 2 to 20 percent of the sequestrant, and
(d) from about 24 to 95.75 percent water.

Preferably, the concentrate, comprises, by weight:

(a) from about 5 to 30 percent of the fatty acid,
(b) from about 4 to 10 percent of the amine,
(c) from about 7 to 15 percent of the sequestrant, and
(d) from about 45 to 82 percent of water.

In use, the concentrate is diluted with water in a respective weight ratio of from about 1:100 to about 1:1000, and, preferably, from about 1:100 to about 1:500. The use solution is prepared by admixing the concentrate with water at ambient conditions.

In another embodiment hereof, when amines having between 2 and 12 carbon atoms are used, as a stress crack inhibitor in the practice of the present invention, it has been discovered that the inclusion of an aryl sulfonate enhances stress crack inhibition as compared to the amine used without the sulfonate. Particularly, a sodium salt of a sulfonated aromatic hydrocarbon having an alkyl or aryl side chain is preferred for use in conjunction with amines of lower molecular weight. Representative of the type of sulfonate contemplated herein is, for example, sodium xylene sulfonate, sodium dimethyl naphthalene sulfonate, sodium salts of linear alkyl benzene sulfonates, ordinarily having from about $C_8$ to about $C_{12}$ in the alkyl portion and the like, as well as mixtures thereof. Preferred sulfonates, for use with the smaller amines, are substituted sodium naphthalene sulfonates.

It should be noted that the preferred sulfonates are, also, solubilizing agents, as well as anionic surfactants. This multi-functionality, thus, contributes to the solubilizing of the fatty acid and the detergency of the lubricant prepared therefrom.

It has been experimentally observed that the sulfonates inhibit stress cracking more effectively in concentrated solution, while the amines are not so limited, since the amines, particularly those of larger molecular size, inhibit stress cracking in plastic articles even when applied in highly dilute solutions thereof.

Although not wishing to be bound by any theory, it would appear that the present stress crack inhibitors "mask" the reactive sites on poly(alkylene terephthalate) articles of manufacture and prevent attack on the ester sites. As is known, PET or poly(ethylene terephthalate) articles, such as beverage containers and the like, are synthesized by the following reaction:

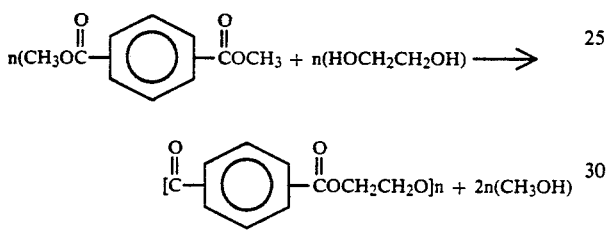

These containers, and like articles, are subjected to cracking along the lines of stress on the surface thereof, by aqueous bottling lubricants, either by attack on the ester linkage or by direct solvent action which destroys the polymeric chain, thereby leading to structural failure. Stress cracking is of particular concern in these types of containers when pressurized fluids such as, e.g., carbonated beverages and the like, are stored therein. However, other poly(alkylene terephthalate) articles of manufacture are subjected to stress because of their shape or other environmental factors, and the composition of the present invention is also effective when used with these non-pressurized articles.

It is to be noted that the present invention is, also, applicable to PBT or poly(butylene terephthalate) containers and other such articles of manufacture.

In use in a dilutable concentrate, and as above noted, the amine stress crack inhibitor is present in an amount of at least two percent, by weight, based on the total weight of the concentrate.

As noted hereinabove, the lubricant concentrate used to apply the stress crack inhibitor is a fatty acid-based lubricant. Useful fatty acids are the long chain carboxylic acids having from about 12 to 22 carbon atoms in the alkyl portion thereof. The fatty acid may be either saturated or unsaturated, or may be a mixture of such acids.

Representative of the fatty acids which may be used are coconut oil fatty acid, lauric acid, myristic acid, palmetic acid, oleic acid, linoleic acid, linolenic acid and the like, as well as mixtures thereof. The preferred fatty acid for the lubricant formula hereof is a mixture of coconut oil fatty acid and oleic acid. In the mixture the oleic and coconut oil fatty acids are each generally present in an amount between about 0.25 parts and about 20 parts by weight based on total concentrate weight, and preferably, between about 0.25 parts and about 10 parts by weight based on total concentrate weight.

Typically, fatty acids are saponified with alkali metal hydroxides, such as potassium hydroxide, in prior art fatty acid lubricants. However, it has been found that sodium and/or potassium hydroxide sometimes contributes to and promotes stress cracking in PET and PBT articles of manufacture. It has further been found, surprisingly, that the stress crack inhibitors hereof help to minimize the cracking caused by sodium or potassium hydroxide, particularly when the molecular size of the alkyl group thereon is sufficiently large, such as e.g., containing 10 to 30 carbon atoms. A preferred class of stress crack inhibitors for use herein are neutrally charged amines, including primary, secondary and tertiary amines.

Various alkyl amines can be successfully employed in this invention. The alkyl amines useful herein are, preferably, amines having the general formula:

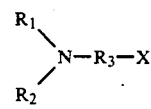

wherein $R_1$ and $R_2$ are each selected from the group consisting of alkyl groups, hydrogen, alcohols, and alkoxy groups, wherein $R_3$ is a linear alkyl group having 1 to 30 carbon atoms and, preferably, from 4 to 20 carbon atoms, and X is either hydrogen, an alkyl group, or a hydrophilic group.

Where X is hydrogen, among the useful amines are, for example, decyl dimethyl amine, N,N-dimethyl octyl amine, octyl amine, nonyl amine, decyl amine, ethyl octyl amine, ethyl hexyl amine and 2-ethyl-1-hexylamine and the like, as well as mixtures thereof. Preferred amines include N,N-dimethyl octyl amine, dibutylamine, and mixtures thereof.

Useful hydrophilic groups which can function as X in the above formula include, for example,

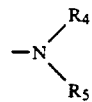

where $R_4$ and $R_5$ can be hydrogen, alkyl, alkoxy, or substituted alkyl) —OH, —$SO_3$, alkoxy and the like.

When X is OH, among the useful alcohol amines are primary, secondary and tertiary alcohol amines. Representative of such compounds are, for example, monoethanol amine, diethanol amine, triethanolamine, dimethyl amino ethanol, bis (2-hydroxyethyl) N-octyl amine, and the like, as well as mixtures thereof. While the smaller amines show better inhibition when used in conjunction with aryl sulfonates, they show some stress crack inhibition when used alone.

When X is —$NH_2$, a useful amine is dimethyl amino propyl amine. When X is

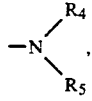

diamines useful in the practice of the present invention include, e.g., hydrogenated tallow diamine, coco diamine, tallow diamine, oleyl diamine, tridecyl ether diamine, and mixtures thereof. These diamines are commercially available from Sherex chemical under the mark "ADOGEN" fatty diamines. Another diamine which can be used in the practice of the present invention either alone or in combination with other amines such as, e.g., oleyl diamine, is bis(3-aminopropyl)-dodecylamine, sold commercially by Lonza as LONZABAC 12.

Other preferred alkoxylated amines are, the ethoxylated amines for example, tallow (ethoxylated) amine, and coconut (ethoxylated) amine such as the compounds set out in Examples 2-21 hereinafter. These compounds are well known and commercially available.

As hereinabove noted, the amine is preferably employed as the neutral amine. However, cationic amine salts are contemplated equivalents of the amines for use in the practice of the present invention.

Furthermore, conventional saponifying agents, such has sodium or potassium hydroxide, may be used alone or in admixture with the amine in the practice of the present invention, since it has been found that the amine inhibits stress cracking which would otherwise be caused by the hydroxides. The lubricant concentrate hereof also contains a hardness sequestrant or chelant, for the purpose of sequestering $Mg^{++}$ and $Ca^{++}$ ions present in the water. The sequestrant may comprise either an organic or inorganic sequestrant. Useful organic sequestrants are alkali metal salts of ethylene diamine tetraacetic acid (EDTA), organic substituted phosphonic acids, nitrilotriacetic acid (NTA) and the like, as well as mixtures thereof. Examples of inorganic sequestrants are the phosphate hardness sequestrants, such as sodium tripolyphosphate. Although any of the enumerated sequestrants may be effectively integrated herein, preferably, the alkali metal salt of EDTA is employed. $Na_4EDTA$ sold under the trade name VERSENE ® and available from Dow Chemical Corporation is utilized herein. Where used, and as noted, the hardness sequestrant is present in an amount of between about 2 and about 20 parts by weight based on total concentrate weight.

The lubricant concetrate hereof may, optionally, also contain a linear alkyl sulfonate to provade detergency. Aryl sulfonates such a those mentioned hereinabove in connection with the small amines may also be used with the larger amines because of their action as surfactants. The amine is effective as a stress crack inhibitor in the composition of the present invention, however, without requiring the presence of an aryl sulfonate.

In preparing a lubricant concentrate in accordance herewith, the water is heated to a temperature of about 100° F. to 120° F. If an aryl sulfonate is used, it is mixed into the water before heating. While maintaining this temperature, the sequestrant, amine and fatty acid, are sequentially added, inthat order, to the solution, with mixing after the addition of each component.

To form a use solution, the present concentrate is diluted with water in a respective weight ratio, ranging from about 1:100 to about 1:1000, and, in particular, from about 1:100 to about 1:500. The use solution is prepared by mixing the concentrate with water under ambient conditions.

It should, also, be noted that the stress crack inhibitor may be otherwise applied to the article, such as by directly coating the article therewith as a pretreatment.

Alternatively, the stress crack inhibitor may be incorporated into a rinse and applied therewith during a rinsing cycle normally associated with a bottling operation or a mechanical dishwashing operation.

Furthermore, the stress crack inhibitor may be applied in poly(alkylene terephthalate) mold grease, etc. and the like.

For a more complete understanding of the present invention reference is made to the following examples. In the examples, which are intended to be illustrative and not limitative, all parts are by weight, absent indications to the contrary.

EXAMPLE 1

A conveyor lubricant concentrate control base was prepared by mixing together at 120° F., with stirring, water, a sequestrant, a nonionic surfactant, a linear alpha-olefin sulfonate, potassium hydroxide 45% solution, and a mixture of long chain fatty acids. The resulting mixture constitutes the control base of the following examples, which is further mixed and diluted therein.

The ingredients employed and their respective amounts are shown below.

| Ingredient | Parts |
| --- | --- |
| Straight Chain Sulfonate[1] | 2.0 |
| EDTA[2] | 16.0 |
| Neodecanoic Acid | 1.7 |
| Tall Oil Fatty Acid | 6.0 |
| Coconut Fatty Acid | 6.0 |
| Nonionic Surfactant[3] | 4.0 |
| Potassium Hydroxide 45% Solution | 6.7 |
| Water | 57.6 |
| | 100.00 |

[1] a linear alpha-olefin sulfonate sold by Stepan Chemical under the mark BIOTERGE AS40
[2] a 39 percent solution of EDTA sold by Dow Chemical under the mark VERSENE
[3] a modified ethoxylated straight chain alcohol nonionic surfactant sold by BASF under the mark Plurafac B-26.

EXAMPLES 2-21

A series of modified lubricant concentrates was prepared by adding 2%, 4%, 8% and 16% by weight of a series of amines to the balance of the premixed control base of Example 1 herein, to make a total of 100% in each case. (Since the control base is premixed, and since it makes up less than 100% of the solutions of these Examples, the percentages of the compornents of the base as set out in Example 1, are reduced accordingly in the solutions of Examples 2-21).

Then, a dilute solution of each of the concentrates was prepared, by mixing 1 part concentrate with 1500 parts of soft water, to provide a corresponding series of dilute use solutions. A dilute solution of the control base alone was also prepared, using the same weight ratio of 1500 parts water to 1 part concentrate.

A series of two liter five-pronged poly(ethylene terephthalate) (hereinafter referred to as PET) bottles were then pressurized at ambient temperatures by adding to the bottle 1850 parts of tap water, 45 parts of sodium bicarbonate and 45 parts of citric acid. Immediately thereafter, the cap was placed back on the bottle, and tightened, and the bottle was then inverted and shaken.

The pressurized bottles were then immersed in the prepared dilute use solutions for 24 hours at approximately 77° F. to evaluate the effectiveness of the stress crack inhibitor in each solution. The following numerical rating system was developed to quantify the observed level of stress cracking on a scale from 1-5, with 5 being total failure of structural integrity via explosion.

| RATING | OBSERVATION |
|---|---|
| 1.0 | No observed stress cracks |
| 1.5 | |
| 2.0 | Minute stress cracking |
| 2.5 | |
| 3.0 | Moderate stress cracking |
| 3.5 | |
| 4.0 | Extensive stress cracking |
| 4.5 | |
| 5.0 | Bottle failure (destruction) |

After 24 hours, the bottles were removed from solution, drained of their contents, and examined to evaluate the degree of stress cracking according to the above system. The dilute use solution of the control base, alone, produced bottles that were consistently rated 4.5 after a 24 hour soak period.

The following table, Table I, sets forth the amines evaluated, the weight percent of amine in the test concentrate, and the stress crack rating of a PET bottle after 24 hours in the use solution according to the above-outlined procedure.

TABLE I

| Test Solution | Rating |
|---|---|
| control base | 4.5 |
| 2% amine A[1] | 4.0 |
| 4% amine A | 3.0 |
| 8% amine A | 2.5 |
| 16% amine A | 2.5 |
| Rating Average - amine A | 3.0 |
| control base | 4.5 |
| 2% amine B[2] | 3.5 |
| 4% amine B | 2.5 |
| 8% amine B | 1.5 |
| 16% amine B | 1.5 |
| Rating Average - amine B | 2.3 |
| control base | 4.5 |
| 2% amine C[3] | 3.0 |
| 4% amine C | 3.0 |
| 8% amine C | 2.5 |
| 16% amine C | 2.5 |
| Rating Average - amine C | 2.8 |
| control base | 4.5 |
| 2% amine D[4] | 4.5 |
| 4% amine D | 4.5 |
| 8% amine D | 4.0 |
| 16% amine D | 3.5 |
| Rating Average - amine D | 4.1 |
| control base | 4.5 |
| 2% amine E[5] | 3.5 |
| 4% amine E | 3.5 |
| 8% amine E | 3.0 |
| 16% amine E | 2.5 |
| Rating Average - amine E | 3.1 |

[1] a mixture of tertiary $C_{12}$ to $C_{16}$ coconut ethoxylated amines sold commercially by Sherek under the mark VARONIC K210
[2] a mixture of tertiary $C_{16}$ to $C_{18}$ tallow ethoxylated amines sold commercially by Sherek Chemical under the mark VARONIC T210
[3] Bis(2-hydroxyethyl)n-octyl amine sold commercially by Heterene Chemical under the mark HETOXAMINE OT-2
[4] Triethanol amine
[5] dibutyl amine A review of the data from Table 1 indicates that in order of effectiveness at inhibiting stress cracking in the tested articles, the tallow (ethoxylated) amines were the most effective, followed by the substituted actyl amine, followed by the coconut (ethoxylated) amine, the dibutyl amine, and the triethanol amine, in decreasing order of effectiveness. All of the amines tested exhibited some effectiveness at stress crack inhibition as compared to the control base above.

EXAMPLES 22-44

A further series of lubricant concentrates were prepared according to the procedure outlined above for Examples 1-21, with the further addition of a sodium alkyl naphthalene aromatic sulfonate sold commercially by DeSoto Chemical under the mark "PETRO BA" in an amount ranging from 20% to 50%. In some cases, amines were added as 8% of the concentrate, and in each of these examples, the premixed control base from Example I was added in an amount sufficient to provide a total of 100%.

As an illustrative example, in the following table, "20% sulfonate A+8% amine D" means that the test solution in this instance was made up of 20% sulfonate A, 8% amine D, and (100-28%) or 72% of the premixed control base of Example 1. To determine the percentages of the ingredients of the control base included in this test solution, the numbers given in Example 1 would have to be multiplied by 0.72.

Dilute use solutions of 1 part concentrate to 1500 parts soft water were then prepared, and pressurized PET bottles were prepared and immersed in the dilute use solutions according to the procedure outlined in Examples 2-21. The bottles were then emptied and examined for stress cracking.

The following table, Table II, sets forth the use solutions evaluated, the additives in the concentrate, and the stress crack rating of the bottles after 24 hours immersion in the use solution according to the above-outlined procedure.

TABLE II

| Test Solution | Rating |
|---|---|
| control base | 4.5 |
| 20% Sulfonate A[1] | 4.0 |
| 30% Sulfonate A | 4.0 |
| 40% Sulfonate A | 4.0 |
| 50% Sulfonate A | 3.5 |
| Rating average - Sulfonate A | 3.9 |
| control base | 4.5 |
| 0% sulfonate A plus 8% amine D[2] | 4.0 |
| 20% Sulfonate A plus 8% amine D | 3.0 |
| 30% Sulfonate A plus 8% amine D | 3.5 |
| 40% Sulfonate A plus 8% amine D | 3.5 |
| 50% Sulfonate A plus 8% amine D | 3.0 |
| Rating average - Sulfonate A plus amine D | 3.3 |
| control base | 4.5 |
| 0% sulfonate A plus 8% AMP[3] | 4.0 |
| 20% Sulfonate A plus 8% AMP | 3.5 |
| 30% Sulfonate A plus 8% AMP | 3.5 |
| 40% Sulfonate A pkus 8% AMP | 3.5 |
| 50% Sulfonate A plus 8% AMP | 3.5 |
| Rating average - Sulfonate A plus AMP | 3.5 |
| control base | 4.5 |
| 0% sulfonate A plus 8% MEA[4] | 4.0 |
| 20% Sulfonate A plus 8% MEA | 4.0 |
| 30% Sulfonate A plus 8% MEA | 3.75 |
| 40% Sulfonate A plus 8% MEA | 3.75 |
| 50% Sulfonate A plus 8% MEA | 3.5 |
| Rating average - Sulfonate A plus MEA | 3.8 |

[1] an alkyl biphenyl sulfonate sold commercially by DeSoto Chemical under the mark PETRO BA and having the structure

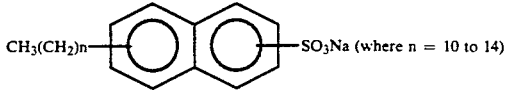

$CH_3(CH_2)n$—[structure]—$SO_3Na$ (where n = 10 to 14)

[2] Triethanol amine
[3] 2-amino-2-methyl-1-propanol (AMP)
[4] monoethanol amine (MEA)

An examination of the data from Tables I and II reveals that the higher molecular weight amines provide the best stress crack inhibition, and while the lower molecular weight amines perform more poorly, their performance can be improved by using them in combination with an aromatic sulfonate. The result is summarized in the following table, Table III, which lists the rating averages from tables I and II in ascending order of molecular size.

TABLE III

| Compound | Number of Carbons in amine molecule | Rating Average |
|---|---|---|
| control base | — | 4.5 |
| Sulfonate A + MEA | 2 | 3.8 |
| Sulfonate A + AMP | 4 | 3.5 |
| Sulfonate A + TEA | 6 | 3.3 |
| TEA (without sulfonate) | 6 | 4.1 |
| dibutyl amine | 8 | 3.1 |
| amine C | 12 | 2.8 |
| amine A | 12-16 (mixture) | 3.0 |
| amine B | 16-18 (mixture) | 2.3 |

A clear trend emerges from a review of Table III, which is that amines with larger molecular size appear to be more effective stress crack inhibitors than the smaller amines. In addition, the sulfonate in combination with the smaller amines is more effective than the small amines without the sulfonate.

EXAMPLES 45-47

A further series of tests was performed to evaluate the stress crack inhibition of an amine when applied to the exterior of a PET article in a separate step from the application of a lubricant concentrate thereto.

In each case, a 2-liter PET bottle was pressurized according to the procedure outlined for Examples 2-21. In Example 45, a control test was performed and nothing was applied to the exterior of the test bottle initially. In Example 46, a concentrated solution of amine B was applied, by wiping, to the exterior of the bottle. In Example 47, the bottle was immersed for a few seconds in a solution of 10% amine B and 90% soft water. Each bottle was then air dried at ambient temperature for about 2 hours. Then 3 dilute solutions were prepared, each solution consisting of 1 part control base to 1500 parts soft water, using the control base Example 1, and each bottle was immersed for 24 hours in the dilute solution. The bottles were then emptied of their contents and were evaluated to see if stress cracking was present. Example 45 exhibited the 4.5 rating which was characteristic of the control base used alone. Example 46, which had the concentrated amine wiped on the surface of the bottle, was rated 1.5 for minute stress cracking. Example 47, which was dipped in the 10% amine solution, was rated 4.0, showing a small amount of stress crack inhibition from the dipping procedure. These examples demonstrate that the application of the amine to the surface of the PET bottles did act to inhibit stress cracking thereof.

Having, thus, described the invention, what is claimed is:

1. A method of inhibiting stress cracking in a poly(alkylene terephthalate) article, comprising the step of applying a composition comprising an amine to a surface of the article, the amine having at least 6 carbon atoms.

2. The method of claim 1, wherein the amine is selected from the group consisting of primary amines, secondary amines, tertiary amines, quaternary amines, diamines, and mixtures thereof.

3. The method of claim 1, wherein the amine is applied as an aqueous-based solution.

4. The method of claim 1, wherein the amine is selected from the group consisting of triethanol amine, dibutyl amine, bis(2-hydroxyethyl)n-octyl amine, coconut (ethoxylated) amine, tallow (ethoxylated) amine, and mixtures thereof.

5. The method of claim 1, wherein the amine is of the formula:

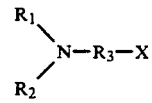

wherein $R_1$ and $R_2$ are each selected from the group consisting of alkyl groups, alkoxy groups, and hydrogen, wherein $R_3$ is a linear alkyl group having from 2 to 30 carbon atoms, and wherein X is selected from the group consisting of hydrogen, alkyl groups, —OH, —$SO_3$, alkoxy groups, and

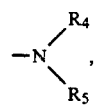

where $R_4$ and $R_5$ are each selected from the group consisting of hydrogen, alkyl groups substituted alkyl groups, and alkoxy groups.

6. A method of inhibiting stress cracking in a poly(alkylene terephthalate) article, comprising a step of applying a composition to a surface of the article, the composition comprising:
  (a) an alkyl amine having from 2-12 carbon atoms, and
  (b) an aryl sulfonate.

7. A method of inhibiting stress cracking in a poly(alkylene terephthalate) article of manufacture, comprising a step of applying a dilute aqueous-based lubricant use solution to an exterior surface of the article, the use solution comprising an alkyl amine having at least 6 carbon atoms, a fatty acid or a mixture of fatty acids, a sequestrant, and water.

8. The method of claim 1, wherein the amine is selected from the group consisting of triethanol amine, coconut (ethoxylated) amine, tallow (ethoxylated) amine, decyl dimethyl amine, N-N-dimethyl octyl amine, nonyl amine, decyl amine, ethyl octyl amine, ethyl hexyl amine, 2-ethyl-1-hexyl amine, dibutyl amino ethanol, bis(2-hydroxyethyl)N-octyl amine, dimethyl amine propyl amine, and mixtures thereof.

9. The method of claim 7, wherein the use solution is prepared by mixing a lubricant concentrate with water in a ratio of about 1:100 to about 1:1000.

10. The method of claim 6, wherein the article is a container and the composition is added to the interior of the container.

11. A method of inhibiting stress cracking in a poly(alkylene terephthalate) container, comprising adding an amine having at least 6 carbon atoms to the interior of the container.

12. An aqueous-based fatty acid lubricant concentrate, comprising:
  (a) a long-chain fatty acid;

(b) an alkyl amine having at least 6 carbon atoms;
(c) a sequestrant; and
(d) water.

13. A solution for applying to poly(alkylene terephthalate) articles to inhibit stress cracking thereof, which is prepared by mixing the composition of claim 12 with water in a ratio from about 1:100 to about 1:1000.

14. The composition of claim 12, further comprising sodium hydroxide or potassium hydroxide.

15. The composition of claim 12, further comprising an alcohol or glycol.

* * * * *